United States Patent
Brown (10) Patent No.: US 9,640,148 B2
(45) Date of Patent: May 2, 2017

(54) METHOD OF AND APPARATUS FOR CONTROLLING FRAME BUFFER OPERATIONS

(71) Applicant: ARM Limited, Cambridge (GB)

(72) Inventor: David Brown, Fulbourn (GB)

(73) Assignee: ARM LIMITED, Cambridge (GB)

( * ) Notice: Subject to any disclaimer, the term of this patent is extended or adjusted under 35 U.S.C. 154(b) by 376 days.

(21) Appl. No.: 13/908,312

(22) Filed: Jun. 3, 2013

(65) Prior Publication Data

US 2014/0354664 A1    Dec. 4, 2014

(51) Int. Cl.
*G09G 5/00* (2006.01)
*G09G 5/36* (2006.01)
*G06F 3/14* (2006.01)
*G06T 1/60* (2006.01)
*G09G 5/393* (2006.01)
*G09G 5/395* (2006.01)

(52) U.S. Cl.
CPC .......... *G09G 5/363* (2013.01); *G06F 3/1415* (2013.01); *G06T 1/60* (2013.01); *G09G 5/393* (2013.01); *G09G 5/395* (2013.01); *G09G 2310/04* (2013.01); *G09G 2320/103* (2013.01); *G09G 2360/122* (2013.01)

(58) Field of Classification Search
None
See application file for complete search history.

(56) References Cited

U.S. PATENT DOCUMENTS

2004/0075657 A1*  4/2004  Chua ............... G06T 19/20
                                                              345/421
2008/0002894 A1*  1/2008  Hayon et al. ............ 382/232
2011/0148892 A1*  6/2011  Shreiner et al. ............ 345/545
2011/0304631 A1* 12/2011  Graffagnino ........ G06F 17/2205
                                                              345/473
2013/0229414 A1*  9/2013  Gruber ........................ 345/426
2014/0063034 A1*  3/2014  Abarca et al. ................ 345/545

FOREIGN PATENT DOCUMENTS

GB      2489798        10/2012
JP      2002015328      1/2002
WO      WO02052506 A1   7/2002

OTHER PUBLICATIONS

Combined Search and Examination Report dated Dec. 10, 2014 in GB Patent Application No. GB1409831.3, 5 pages.
JP2002015328 English abstract, published Jan. 18, 2002, 1 page.

* cited by examiner

Primary Examiner — William Beutel
(74) Attorney, Agent, or Firm — Vierra Magen Marcus LLP

(57) ABSTRACT

A data processing system comprises a host processor and a graphics processor that renders frames to be output and writes those frames to a frame buffer.

When a new frame is to be generated and written to the frame buffer, the host processor determines, for a set of plural sub-regions that the frame has been divided into, which of those sub-regions could have changed from the frame previously used for the frame buffer 30 and generates information indicating which sub-regions should be rendered to generate the new frame on the basis of the determination 31.

The information indicating which sub-regions should be rendered to generate the frame is provided to the graphics processor 32 and the graphics processor uses the provided sub-region information to render only the indicated sub-regions 33.

17 Claims, 5 Drawing Sheets

METHOD OF AND APPARATUS FOR CONTROLLING FRAME BUFFER OPERATIONS

BACKGROUND

The technology described herein relates to methods of and apparatus for displaying windows, e.g., for a graphical user interface, on a display in a unified frame buffer, and then the unified, output frame then read.

As is known in the art, many electronic devices and systems use windows for displaying information, such as a graphical user interface, game, demo, etc., to a user on a display screen (and for allowing a user to interact with an application or applications being executed).

Each individual application will typically produce a sequence of frames corresponding to their respective windows (these frames are typically generated (rendered) by a graphics processing system). The output to be displayed on the display device is then generated using the windows (frames) generated by the application or applications, usually using a so-called compositing window system, in which the windows (frames) for the application(s) are rendered appropriately into a unified frame buffer for the display in question in order to display the windows to the user. This operation of rendering the frames into the frame buffer is usually performed by a graphics processing system, under the control of a window "compositor". The "composited" output generated by the graphics processing system that is to be displayed is usually written to a so-called "frame buffer" in memory for the display device (which may, e.g., be a screen or printer) for display. Typically a pair of frame buffers ("front" and "back" frame buffers) are provided, one to store the frame that is currently being displayed, while the next frame is written into the other.

The writing of frames to a frame buffer by a graphics processing system is a relatively expensive operation. For example, LCD displays are typically refreshed at a constant high rate typically between 60-70 Hz. Each such "refresh" involves generating and writing a new frame to the frame buffer. This involves, inter alia, lots of power hungry memory and display accesses.

It is known therefore in 2D compositing window systems to track which areas of a frame have actually changed (known as "dirty" regions) and only issue drawing commands to the graphics processing system for those changed parts of the frame. To achieve this, the existing pixel contents of the "current" frame buffer must always be copied onto the back frame buffer between frames to ensure that pixels outside of the dirty regions are preserved and correct. Copying the entire contents of the buffer can be costly, so in order to increase performance some compositors make use of graphics API (Application Programming Interface) extensions allowing them to inform the graphics processor device driver of the dirty regions that they intend to overwrite. This allows the graphics processor (GPU) to only preserve those pixels which will not be overwritten when the new frame is rendered.

However, notwithstanding this, the Applicants believe that there remains scope for improvements to such frame buffer operations in data processing systems.

BRIEF DESCRIPTION OF THE DRAWINGS

A number of embodiments of the technology described herein will now be described by way of example only and with reference to the accompanying drawings, in which.

Like reference numerals are used for like features in the Figures where appropriate.

DETAILED DESCRIPTION

A first embodiment of the technology described herein comprises a method of operating a data processing system that comprises a host processor and a graphics processor that in response to commands and data received from the host processor, renders frames to be output and writes those frames to a frame buffer, the method comprising:

when a new frame is to be generated and written to the frame buffer:

determining, for a set of plural sub-regions that the frame has been divided into, which of those sub-regions could have changed from the frame previously used for the frame buffer;

generating information indicating for the set of plural sub-regions that the frame has been divided into, which of those sub-regions should be rendered to generate the new frame on the basis of the determination; and providing to the graphics processor information indicating, for the set of plural sub-regions that the frame has been divided into, which of those sub-regions should be rendered to generate the frame; and the graphics processor using the provided sub-region information to determine those sub-regions in the frame that it should render, rendering those sub-regions, and writing the so-rendered sub-regions to the frame buffer.

A second embodiment of the technology described herein comprises a data processing system comprising:

a host processor;

a graphics processor that in response to commands and data received from the host processor, renders frames to be output and writes those frames to a frame buffer; and a frame buffer that stores output frames generated by the graphics processor; wherein the data processing system is configured to:

when a new frame is to be generated and written to the frame buffer:

determine, for a set of plural sub-regions that the frame has been divided into, which of those sub-regions could have changed from the frame previously used for the frame buffer;

generate information indicating for the set of plural sub-regions that the frame has been divided into, which of those sub-regions should be rendered to generate the new frame on the basis of the determination; and provide to the graphics processor the information indicating, for the set of plural sub-regions that the frame has been divided into, which of those sub-regions should be rendered to generate the frame; and the graphics processor is configured to use the provided sub-region information to determine those sub-regions in the frame that it should render, render those sub-regions, and to write the so-rendered sub-regions to the frame buffer.

The technology described herein relates to arrangements in which a graphics processor produces output frames, e.g.

to be displayed on a display device, such as a screen. However, in the technology described herein, it is determined, for a set of plural sub-regions that the frame has been divided into, which of those sub-regions could have changed from the frame previously used for the frame buffer and information indicating those sub-regions is then provided to the graphics processor. The graphics processor then generates only those sub-regions for the frame. This then means that, in effect, the graphics processor can be controlled to process only those sub-regions of the frame that have changed, such that any sub-regions outside of the "changed" regions will not need to be processed, rendered or written back to memory, thereby causing savings in power and increasing performance when compared to rendering the entire frame.

In other words, the technology described herein facilitates allowing only sub-regions of the frame to be rendered by supplying an "update map" that indicates only those sub-regions in the frame (render target) that should be processed. This then allows only "updated" regions of the frame to be rendered instead of the entire frame, thereby saving power and increasing performance.

The sub-regions in the set of sub-regions that the frame is divided into for the purpose of the technology described herein can each represent any suitable and desired sub-region (area) of the frame. So long as the frame is divided or partitioned into a plurality of identifiable smaller regions each representing a part of the overall frame that can be identified, then the sub-division of the frame into sub-regions can be done as desired.

Each frame sub-region should represent a different part (sub-region) of the frame, such as a plurality of data positions within the frame. Suitable sub-region sizes would be, e.g., 8×8, 16×16 or 32×32 data positions in the frame (as is known in the art, each frame will essentially be generated as an array of data (e.g. colour) values, each representing a respective position in the frame).

The set of sub-regions is in an embodiment predetermined (i.e. the frame (and each frame) is in an embodiment divided into a predetermined set of plural sub-regions for the purposes of the technology described herein). In an embodiment the frames are divided into a fixed, predetermined set of regions (in an embodiment independent of the size of the frames).

In one embodiment, the frames are divided into regularly sized and shaped sub-regions (e.g. blocks of data), in an embodiment in the form of squares or rectangles.

In one embodiment, each frame sub-region corresponds to a rendered tile that the graphics processor that is rendering (generating) the frame produces as its rendering output.

(As is known in the art, in tile-based rendering, the two dimensional output array or frame of the rendering process (the "render target") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete output array (frame) (render target), e.g. for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

In these arrangements of the technology described herein, the (rendering) tiles that the frames are divided into for rendering purposes can be any desired and suitable size or shape. The rendering tiles are in an embodiment all the same size and shape, as is known in the art, although this is not essential. In an embodiment, each rendering tile is rectangular (and in an embodiment square), and in an embodiment 8×8, 16×16, or 32×32 sampling positions in size.

In another embodiment, the frame sub-regions that are considered in the technology described herein each correspond to a set of plural "rendering" tiles, in an embodiment an integer set of tiles. This may reduce the amount of "sub-region indicating information" that needs to be provided to the graphics processor, albeit at the expense of a lower resolution (more coarse-grained) division of the frames.

The same sub-region configuration (size and shape) is in an embodiment used across the entire frame.

The determination of which sub-regions of the set of sub-regions that the frame has been divided into could have changed and thus should be rendered can be done in any suitable and desired manner. It should be noted in this regard that the determination is to determine the changes between the new frame and the frame that was previously used for the frame buffer. In particular, while the frame that was previously used for the frame buffer may be the previous frame that, e.g., was produced by (rendered for) the application in question, it need not be, e.g. in the case where the rate at which the application(s) produces frames is different to the rate at which the window compositor consumes (uses) frames (transfers the frames to the display frame buffer). In this latter case, the determination of the changes between the frames will not be based on the immediately preceding frame that was rendered by the application, but will be based on the most recent frame from the application that was actually used to update the frame buffer (by the compositor). This will also ensure that all the frame sub-regions that have changed since the last frame was stored in the frame buffer will be rendered into the frame buffer. It will also help if there are multiple compositors in the system running at different rates, but consuming the same application frames.

Where, for example, the host processor (e.g. window compositing system) already tracks which areas of a frame have actually changed, then that information can be used to determine the sub-regions of the set of sub-regions that should be rendered for the frame. In this case, the changed sub-regions and the sub-region processing information would accordingly be determined and generated from a list of, e.g., dirty rectangles (dirty regions), provided by the host processor (e.g. compositor) (and in an embodiment this is what is done). In this case, the determination of which sub-regions have (potentially) changed and thus should be rendered will accordingly in an embodiment comprise converting a screen-space area indication of changed parts of a frame (such as the screen-space dirty rectangles determined, e.g. by the compositor), to sub-region indications within the frame.

In another embodiment, which sub-regions of the set of sub-regions have changed and so should be rendered is determined by comparing respective sub-regions in the frames to determine which sub-regions (if any) have changed between the frames. This may be particularly appropriate where such sub-region comparisons are already being performed for other purposes, e.g. to determine whether sub-regions of the successive frames are sufficiently similar to be able to, for example, eliminate reading and/or writing of those sub-regions from or to memory. In this case the information from the comparison of the sub-regions can also be used to generate the information indicating which sub-regions in the set of sub-regions need to be rendered.

In these arrangements, the previous and new versions of the frame can be compared in any suitable and desired manner to determine the sub-regions that have changed. In an embodiment each respective pair of sub-regions (one from each frame) is compared, to determine if that sub-region has changed or not.

The comparison of a sub-region in the new frame with the corresponding sub-region in the frame previously used for the frame buffer should be so as to determine whether the new sub-region is the same as (or at least sufficiently similar to) the previous sub-region or not. This can be done in any suitable and desired manner. Thus, for example, some or all of the content of the new sub-region may be compared with some or all of the content of the previous sub-region (and in one embodiment this is done).

The comparison process may, e.g., require an exact match for the sub-regions to be considered to match (to have not changed), or only a sufficiently similar (but not exact) match, e.g., that exceeds a given threshold, could be required for the sub-regions to be considered to match.

In an embodiment, the comparison is performed by comparing information representative of and/or derived from the content of the new sub-region with information representative of and/or derived from the content of the previous version of the sub-region, e.g., and in an embodiment, to assess the similarity or otherwise of the sub-regions.

The information representative of the content of the sub-regions is in an embodiment in the form of information representative of the content of each sub-region (e.g. rendered tile). This information for each frame sub-region (e.g. rendered tile) may take any suitable form, but in an embodiment is based on or derived from the content of the respective frame sub-region. In an embodiment it is in the form of a "signature" for the frame sub-region which is generated from or based on the content of the frame sub-region. Such a frame sub-region content "signature" may comprise, e.g., and in an embodiment, any suitable set of derived information that can be considered to be representative of the content of the frame sub-region, such as a checksum, a CRC, or a hash value, etc., derived from (generated for) the data for the frame sub-region. Suitable signatures would include standard CRCs, such as CRC32, or other forms of signature such as MD5, SHA-1, etc.

Thus, in an embodiment, a signature indicative or representative of, and/or that is derived from, the content of each frame sub-region is generated for each frame sub-region that is to be compared, and the comparison process comprises comparing the signatures of the respective frame sub-regions.

Thus, in an embodiment, the technology described herein comprises comparing a signature representative of the content of a sub-region (e.g. a rendered tile) of a new version of a frame to be output with a signature for the corresponding frame sub-region (e.g. tile) for the frame previously used for the frame buffer, and generating information indicating whether the frame sub-region has changed or not based on the comparison. In an embodiment, this is repeated for each sub-region that the frame is divided into.

In these arrangements, the signatures for the frame sub-regions (e.g. rendered tiles) are in an embodiment stored appropriately, and associated with the versions of the frames to which they relate. In an embodiment they are stored with the frame buffers. Then, when the signatures need to be compared, the stored signature for a sub-region can be retrieved appropriately.

In the case where there may be several potential input sources for a given frame, then respective pairs of input sources content signatures for the sub-regions could be compared, and the sub-region change information generated accordingly, e.g. a "changed" bit set if any of them differ. In an embodiment this process is halted as soon as any difference indicating the need to re-render the sub-region is detected (rather than continuing with further sub-region comparisons).

The information indicating which sub-regions of the set of sub-regions that the frame has been divided into should be processed can be configured as desired. In an embodiment this is in the form of a bitmap (an array of bits) with each bit representing a respective sub-region in the frame. Each bit can then be set to indicate whether the sub-region that it represents should be processed or not. In an embodiment sequential bits represent sequential sub-regions. This is a particularly convenient mechanism for providing the sub-region of processing information. The graphics processor can then read this sub-region map as an input to its frame rendering process.

Thus where the sub-regions that the frame is divided into for this purpose correspond to individual tiles that the graphics processor generates, the sub-region processing information is in an embodiment in the form of a tile bitmap, with each bit representing a tile in the frame (and, in an embodiment, sequential bits representing sequential tiles).

Other arrangements would, of course, be possible.

The changed sub-region determination and information generation can be done where desired. In one embodiment the determination and the generation of the changed sub-region information is done on the host processor (CPU) and then provided to the graphics processor. In this case, in an embodiment it is the driver for the graphics processor on the host CPU that does the determination and generates the changed sub-region information (map).

In another embodiment, the determination and generation of the changed sub-region information is done on or by the graphics processor itself. Thus, in an embodiment, the graphics processor determines which of the sub-regions could have changed from the frame previously used for the frame buffer, and generates the information indicating which sub-regions should be rendered to generate the new frame. In this case, the graphics processor will create and then consume (use) the changed sub-region information (the changed sub-region map). This would remove the need for the host processor to, e.g., do any conversion from screen-space dirty rectangles to frame sub-region (e.g. tile) map values.

Where the changed sub-region information is to be determined and generated on the graphics processor itself, then this is in an embodiment performed by using a compute job on the graphics processor to implement the method in question. Thus, for example, in an embodiment, the graphics processor executes a compute step which takes in the array of dirty rectangles from (e.g. the compositor on) the host processor, and generates a sub-region map indicating those sub-regions that have changed. In these arrangements, the compute job on the graphics processor could, e.g., take the form of an explicit graphics processor job generated by the graphics processor driver and inserted into the list of jobs to be run on the graphics processor, or be a new feature of the graphics processor which specifically feeds into the rest of the graphics processing pipeline.

The changed sub-region information for a frame could be generated in its entirety before being provided for use by the graphics processor (and in one embodiment that is what is done). However, it would also be possible to generate this information "on the fly", e.g. by comparing each successive pair of previous and new sub-regions in turn, and then indicating that the sub-region needs to be rendered or not (and then rendering the sub-region accordingly) immediately the comparison is completed.

Thus in an embodiment, the compositor on the host processor enables sub-regions for rendering by directly comparing values representative of the content of those sub-regions and providing an instruction to the graphics processor for that sub-region accordingly. Thus instead of reading a single bit for each sub-region, the compositor may read the current and previous, e.g. signature value, from each possible input sub-region, and proceed to instruct the graphics processor to render the sub-region if any of them differ. Pointers to the stored current and previous signature values may be provided to the compositing step by the host processor (CPU).

In an arrangement where there are multiple graphics processing cores operating to generate the same frame for the frame buffer, then in an embodiment, respective changed sub-region information (maps) are maintained and provided to each graphics processing core separately, and the results of the processing cores are each written out separately, as that will help to avoid the multiple graphics processing cores conflicting over the same memory locations.

The graphics processor renders the new frame into the frame buffer in response to commands and data received from the host processor. This is in an embodiment done in response to, and under the control of, a compositor (a window compositor) of the host processor (host system). The processing of a new frame may be triggered as desired. In an embodiment, the graphics processor is issued with an instruction to render the frame with a single draw call which contains the sub-region processing information.

The frame buffer that the frame data is to be written to may comprise any suitable such buffer and may be configured in any suitable and desired manner in memory. For example, it may be an on-chip buffer or it may be an external buffer (and, indeed, may be more likely to be an external buffer (memory), as will be discussed below). Similarly, it may be dedicated memory for this purpose or it may be part of a memory that is used for other data as well. In an embodiment the frame buffer is a frame buffer for the graphics processing system that is generating the frames, and/or for the display device that is to display the frames.

In an embodiment there are plural, in an embodiment two, frame buffers. In this case each new version of the frame is in an embodiment written into a different frame buffer to the previous version of the frame. For example, the new frames may be written to the different frame buffers alternately.

The data for any frame sub-regions that will not be newly rendered when a new frame is being generated in the manner of the technology described herein is in an embodiment retained in or copied to (as appropriate) the frame buffer that the new frame is being written to, so that data for those frame sub-regions is present in the frame buffer that the new frame is being stored in.

In an embodiment, the technology described herein is used in conjunction with another frame (or other output) buffer power and bandwidth reduction scheme or schemes, such as, and in an embodiment, output (e.g. frame) buffer compression (which may be lossy or loss-less, as desired).

Although the technology described herein has been described above primarily with reference to rendering one new frame, as will be appreciated by those skilled in the art, this process can be, and in an embodiment is, repeated for plural versions of a given frame that is being generated (and as they are generated), and in an embodiment as each successive new version of the frame is generated.

The graphics processor may contain any suitable and desired processing stages that a graphics processing pipeline may contain such as a rasteriser, an early depth (or an early depth and stencil) tester, a renderer (a fragment shader), a late depth (or depth and stencil) tester, a blender, a tile buffer, a write out unit, etc.

The technology described herein can be used for all forms of output that a graphics processing pipeline may be used to generate, such as frames for display, render-to-texture outputs, etc.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and in embodiments do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described.

The present embodiment relates to a compositing window systems, in which the contents of windows to be displayed on a display, e.g., for a graphical user interface, are first drawn into "off-screen" frame buffers, and then written to the frame buffer for the display to be displayed.

Figure 1:
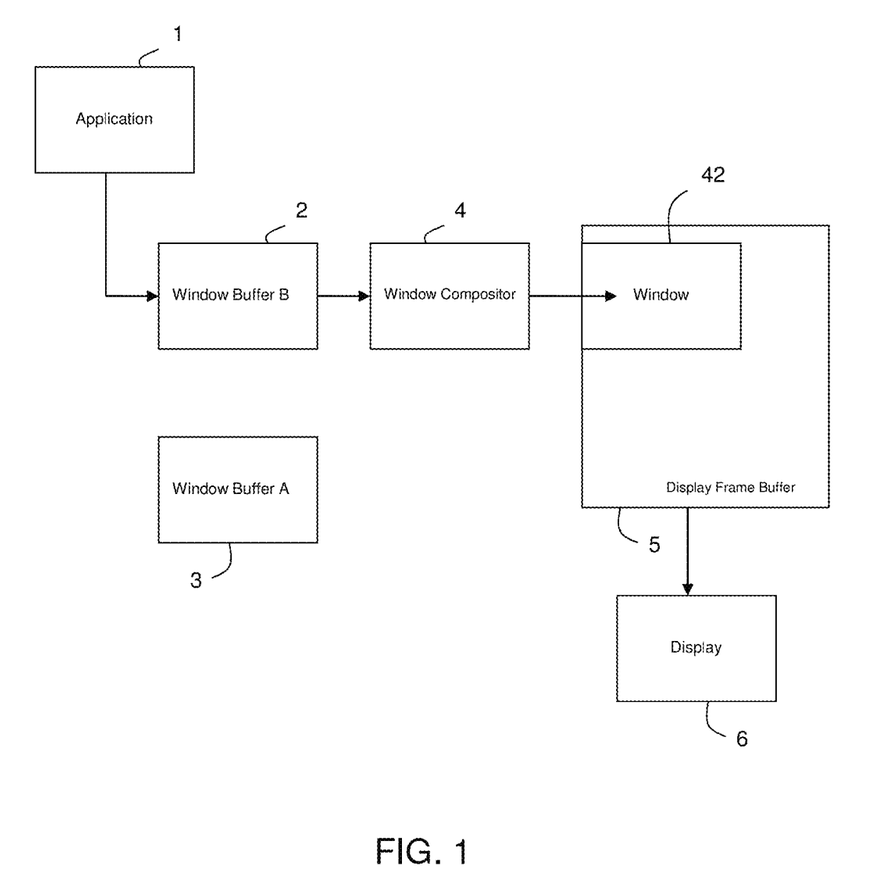
FIG. 1 shows schematically the operation of a compositing window system for displaying windows on a display.

FIG. 1 illustrates this process and shows schematically the generation of windows for an application 1 such as a game, productivity application (e.g. word-processor, spreadsheet), etc., to be displayed on a display 6. The display 6 may be any suitable form of electronic display, such as a screen of a monitor for a personal computer, a screen of a device such as a phone, tablet, PDA, etc.

As shown in FIG. 1, as the successive frames representing versions of a window to be displayed are generated, they are written into respective window buffers 2, 3. In this embodiment, the window buffer A 3 is assumed to contain the previous version of the frame that has been used to draw the current version of the window 42 as it appears in the display frame buffer 5, and the next version of the frame that is generated when the window needs to be updated (for example due to user interaction) is written into a different window buffer B 2. The window buffers 2, 3 are read by a window compositor 4 and written to the frame buffer 5 for the display for display. This writing can, as is known in the art, involve, for example, blending the frame with other frames (windows), applying some form of geometric transformation to the frame as it is written from the window buffer to the display frame buffer, etc., and/or just be an opaque copy. When a window needs to be updated (for example due to user interaction), the frame for the window is redrawn into a new window buffer, from which the window compositor 4 then writes the new version of the window (the new frame) to the display's frame buffer 5.

The display frame buffer 5 is then read to display the window (frame) 42 on the display 6.

In this embodiment, it is assumed that the window compositor 4 is, as is known in the art, a separate process running in the system which causes frames from several applications in the system to be rendered into the display frame buffer 5. The window compositor 4 may use alpha-blending, transformations or other techniques rather than straight copies when a frame is written to the display frame buffer 5, if desired. To write the frames to the display frame buffer 5, the window compositor 4 controls a graphics processor to render the frames appropriately into the display frame buffer 5. The technology described herein can also be used when the application 1 itself is responsible for the writing of its own frames to the display frame buffer 5.

Figure 2:
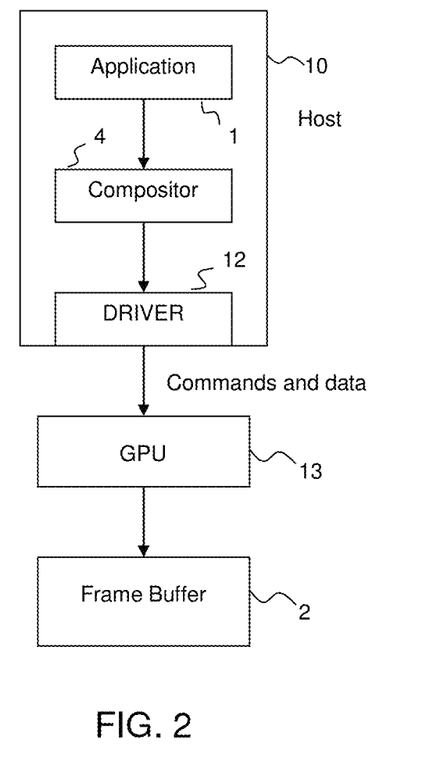
FIG. 2 shows schematically a graphics processing system of an embodiment of the technology described herein.

In the present embodiment, the frames representing the windows to be displayed are rendered into the display frame buffer 5 by a graphics processing system (under the control of the window compositor 4). FIG. 2 shows schematically an arrangement of a graphics processing system that can be used in embodiments of the technology described herein.

FIG. 2 shows a typical computer graphics processing system. An application 1, such as a game, executing on host processor 10 will require graphics processing operations to be performed by an associated graphics processor 13. To do this, the application will generate API calls that are interpreted by a driver 12 for the graphics processor 13 that is running on the host processor 10 to generate appropriate commands to the graphics processor 13 to generate the graphics output required by the application 1.

The graphics processor 13 shown in FIG. 2 is a tile-based graphics processing pipeline and will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

As is known in the art, in such an arrangement, once a tile has been generated by the graphics processor 13, it would then normally be written to a window buffer in memory, e.g., via an interconnect which is connected to a memory controller (not shown). Sometime later the window buffer will be written, as discussed above, to a frame buffer 2 for a display for display on the display.

As shown in FIG. 2, the host processor 10 also executes a window compositor 4, that performs window compositing functions and operations (as discussed above). With regard to the present embodiment, and as will be discussed further below, the compositor 4 tracks which areas of the frame have changed when the application 1 requires a new frame to be drawn (tracks the "dirty regions" of the frame) and provides this information to the driver 12 for the graphics processor 13.

In the present embodiment, when a new version of a frame is to be rendered and stored in the frame buffer 2 by the graphics processor 13, the window compositor 4 on the host processor 10 provides its "dirty region" information to the driver 12 for the graphics processor 13.

The driver 12 then uses that dirty region information to determine which tiles in the frame to be rendered by the graphics processor 13 have changed from the frame previously stored in the frame buffer 2, by converting the screen space dirty region information from the compositor 4 into corresponding tile positions. (As discussed above, the determination is to determine the changes between the new frame and the frame that was previously used for the frame buffer. Thus, while the frame that was previously used for the frame buffer may be the previous frame that, e.g., was produced by (rendered for) the application in question, it need not be, e.g. in the case where the rate at which the application(s) produces frames is different from the rate at which the window compositor consumes (uses) frames (transfers the frames to the display frame buffer). In this latter case, the determination of the changes between the frames will not be based on the immediately preceding frame that was rendered by the application, but will be based on the most recent frame from the application that was actually used to update the frame buffer (by the compositor).)

The driver 12 then produces a tile map in the form of an array of bits in which each bit represents a tile in the frame buffer (and sequential bits represent sequential tiles), to indicate the tiles in the frame that have been changed for the new frame (according to the tracked dirty region information), and stores that tile map in memory. Where the driver has determined that a tile has changed for the new frame, it sets the bit for that tile in the tile map to indicate that the corresponding tile should be rendered into the frame buffer 2 by the graphics processor. (If a tile's bit in the tile map is not set, the tile will not be processed by the graphics processor.)

The tile map is then read by the graphics processor 13 from memory when it is to render the frame into the frame buffer 2. (The processing of the new frame is triggered in the present embodiment by issuing the graphics processor 13 with an instruction to render the frame with a single draw call which contains the tile map.) For each respective tile of the frame, the graphics processor 13 first reads the corresponding bit in the tile map, and if the bit is set, renders the tile and stores it in the frame buffer, but if the tile map bit is not set, does not render the tile and moves on to the next tile instead.

The data for any frame sub-regions that will not be newly rendered when the new frame is being generated is retained in or copied to (as appropriate) the frame buffer 2 that the new frame is being written to, so that data for those frame sub-regions is present in the frame buffer that the new frame is being stored in.

Figure 3:
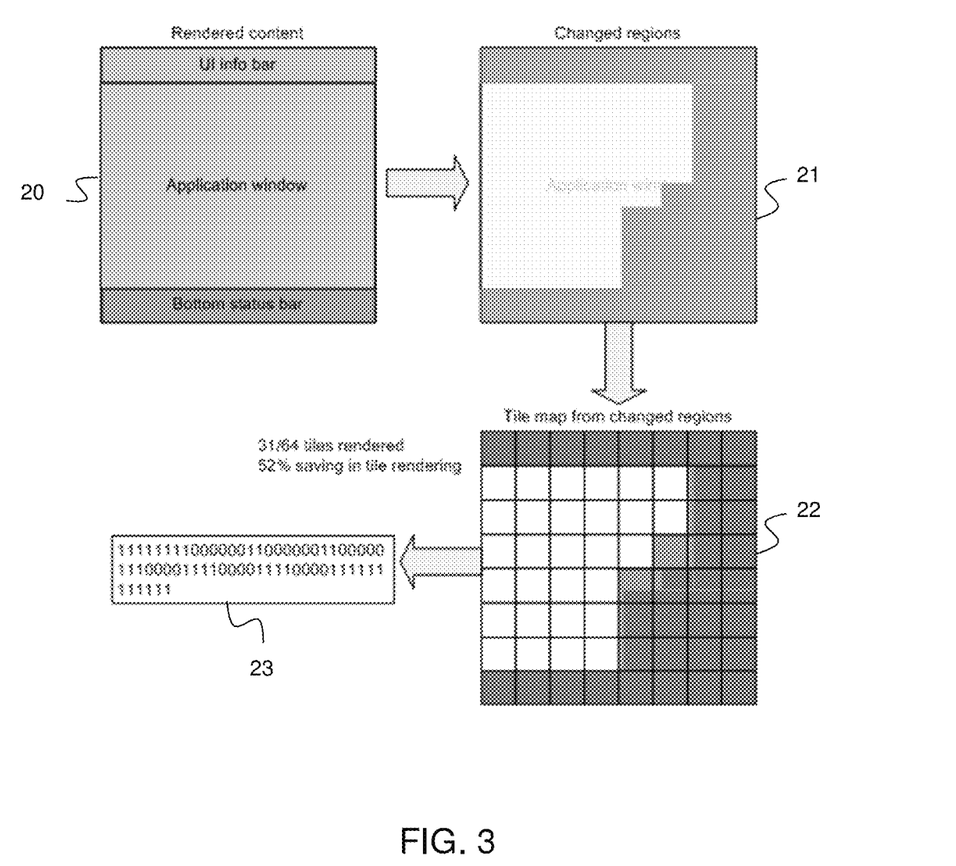
FIGS. 3 and 4 show schematically an embodiment of the technology described herein.
Figure 4:
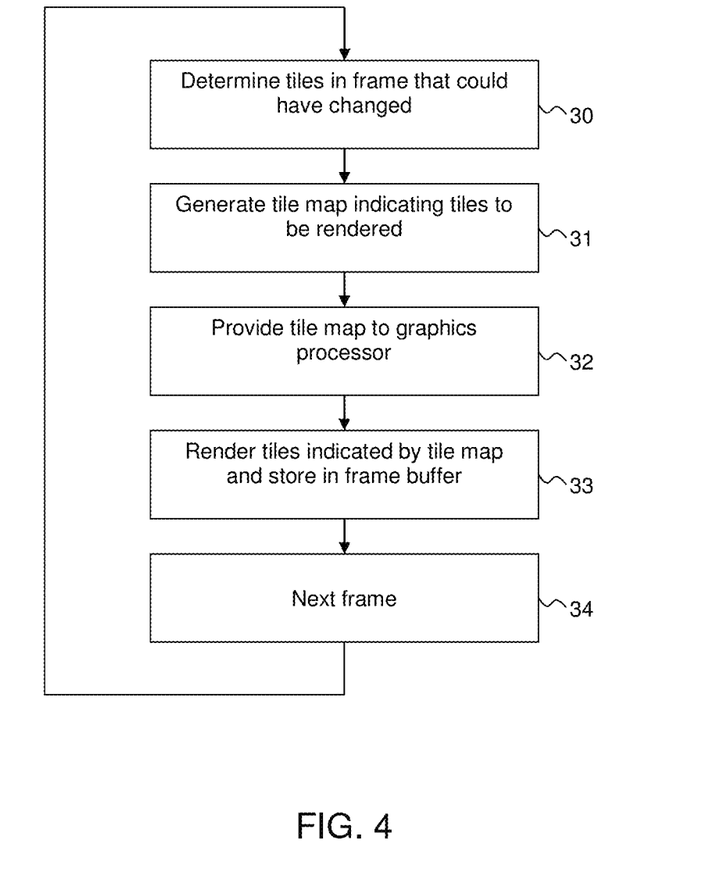

FIGS. 3 and 4 illustrate this process.

FIG. 3 shows schematically an exemplary frame 20 to be generated by the graphics processor 13 together with the corresponding "dirty regions" map 21 generated by the compositor 4 on the host processor 10. As shown in FIG. 3, this changed sub-regions map is then converted by the driver 12 to corresponding tile positions within the frame 22, and a corresponding tile bitmap 23 is then generated to indicate which tiles in the frame have changed and so need to be rendered. The tile bitmap 23 is appropriately stored in memory so that it can be retrieved and used by the graphics processor 13 when it actually renders the frame into the frame buffer. As can be seen, in this example only 31 out of 64 tiles actually need to be rendered, thereby giving a 52% saving in tile rendering.

FIG. 4 is a flowchart showing schematically the generation and use of the tile map 23. Thus as shown in FIG. 4, the driver 12 on the host processor 10 first determines the tiles in the frame that could have changed from the dirty region information provided by the compositor 4 (step 30), and then generates a tile map indicating the tiles to be rendered from the determined tiles in the frame that could have changed (step 31). Then, when the frame is to be rendered into the frame buffer 2, the tile map is provided to the graphics processor (step 32), and the graphics processor 13 proceeds to render the tiles indicated as to be rendered by the tile map and stores those tiles in the frame buffer (step 33). Once the current frame has been completed, the process can then move on to the next frame and so on (step 34).

In this way, the present embodiment can avoid the graphics processor 13 rendering into the display frame buffer regions of a frame that don't actually change from the previously-used version of a frame to the next (in the case of a game, this would typically be the case for much of the user interface, the sky, etc., as well as most of the playfield when the camera position is static). This can save a significant amount of bandwidth and power consumption in relation to the frame buffer operation.

Although the present embodiment has been described above primarily with reference to generating one new frame for writing to the frame buffer, as will be appreciated by those skilled in the art, this process can be, and in an embodiment is, repeated for plural frames (e.g. versions of a given window) that are being generated (and as they are generated), and in an embodiment as each successive new frame (e.g. version of the window) is generated.

A number of other alternatives and arrangements of the above embodiment and of the technology described herein could be used if desired.

For example, although the embodiment has been described above, inter alia, with reference to the use of frame sub-regions correspond to rendering tiles, it is not necessary that the frame sub-regions that are considered correspond exactly to rendering tiles that will be generated by the graphics processor. For example, the frame sub-regions that are considered could be made up of plural rendering tiles.

In this case, the frame will be divided into "coarser" sub-regions such that instead of detailing a map of every single tile, the frame will be divided into groups of plural tiles, with each such region of plural tiles then being able to be enabled/disabled for a given frame. This will reduce the amount of information that needs to be passed to the graphics processor in terms of the "tile" map, but potentially at the expense of having to render more tiles.

Figure 5A:
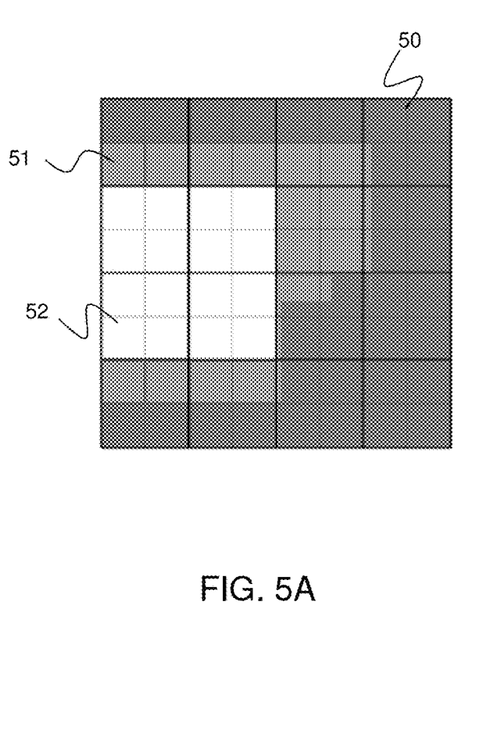
FIGS. 5A and B schematically show further embodiments of the technology described herein.
Figure 5B:
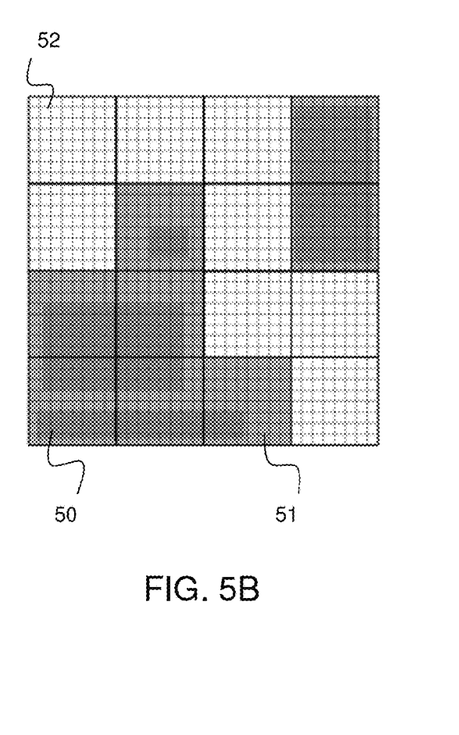

FIG. 5 shows schematically two such arrangements. FIG. 5A shows an exemplary frame of 8×8 rendering tiles, in which the frame has been divided into sub-regions of 2×2 tiles for the purposes of the technology described herein. FIG. 5B shows an exemplary 64×64 tile frame, that has been divided into 8×8 tile sub-regions for the purposes of the technology described herein. In FIG. 5 the darker regions 50 show the actual dirty regions indicated by the window compositor, and the lighter regions 51 show the actual tiles that will be rendered based on the tile map information (and the white regions 52 show tiles that will not be rendered).

Similarly, although in the above embodiment the changed sub-regions and the sub-region processing information (tile map) is determined and generated from a list of, e.g., dirty rectangles (dirty regions), provided by the host processor (compositor 4), other arrangements for determining which sub-regions of the set of sub-regions that the frame has been divided into could have changed would be possible.

For example, which sub-regions of the set of sub-regions that have changed and so should be rendered could be determined by comparing respective sub-regions in successive frames to determine which sub-regions (if any) have changed between the frames.

In this case, a signature indicative or representative of, and/or that is derived from, the content of each frame sub-region could be generated for each frame sub-region that is to be compared, with the comparison process then comprising comparing the signatures of the respective frame sub-regions. For example, a signature value representative of the content of each tile for a given version of a frame could be derived from the tile's pixel data. Such frame sub-region content "signatures" could comprise, e.g., a checksum, a CRC, or a hash value, etc., derived from (generated for) the data for the frame sub-region. Suitable signatures would include standard CRCs, such as CRC32, or other forms of signature such as MD5, SHA-1, etc. The signatures could be generated, e.g., by the host CPU as the frame sub-regions are generated.

This comparison may be done, for example, by the application itself, by the window compositor 4, or by any other suitable element or component of the system.

In these arrangements, the signatures for the frame sub-regions (e.g. rendered tiles) are in an embodiment stored appropriately, and associated with the versions of the frames to which they relate. In an embodiment they are stored with the frame buffers. Then, when the signatures need to be compared, the stored signature for a sub-region can be retrieved appropriately.

In the case where there may be several potential input sources for a given frame to be displayed, then respective pairs of input source content signatures for the sub-regions could be compared, and the sub-region change information generated accordingly, e.g. a "changed" bit set if any of them differ. This process may be halted as soon as any difference indicating the need to re-render the sub-region is detected (rather than continuing with further sub-region comparisons).

Although in the above embodiments, the determination and the generation of the changed sub-region information is done on the host processor (CPU) (e.g. by the driver for the graphics processor on the host CPU), and then provided to the graphics processor, it would be possible for the determination and generation of the changed sub-region information to also or instead be done on or by the graphics processor itself.

This could be done, e.g., by using a compute job on the graphics processor to implement the method in question (e.g. to convert the "dirty region" information from the compositor to a tile map, and/or to generate and compare sub-region content-indicating "signatures"). The compute job on the graphics processor could, e.g., take the form of an explicit graphics processor job generated by the graphics processor driver and inserted into the list of jobs to be run on the graphics processor, or be a new feature of the graphics processor which specifically feeds into the rest of the graphics processing pipeline.

In the above embodiment, the changed sub-region information for a frame is generated in its entirety before being provided for use by the graphics processor. However, it would also be possible to generate this information "on the fly", e.g. by comparing each successive pair of previous and new sub-regions in turn, and then indicating that the sub-region needs to be rendered or not (and then rendering the sub-region accordingly) immediately the comparison is completed.

In this case, the, e.g., compositor on the host processor could enable sub-regions for rendering by directly comparing signature values representative of the content of those sub-regions and then providing an instruction to the graphics processor for that sub-region accordingly. Thus instead of reading a single bit for each sub-region, the compositor may read the current and previous, e.g. signature value, from each possible input sub-region, and proceed to instruct the graphics processor to render the sub-region if any of them differ. Pointers to the stored current and previous signature values may be provided to the compositing step by the host processor (CPU) to assist this.

In an arrangement where there are multiple graphics processing cores operating to generate the same frame for the frame buffer, then in an embodiment, respective changed sub-region information (tile maps) are maintained and provided to each graphics processing core separately, and the results of the processing cores are each written out separately, as that will help to avoid the multiple graphics processing cores conflicting over the same memory locations.

It can be seen from the above that the technology described herein, in its embodiments at least, can help to reduce, for example, power consumption and memory bandwidth when rendering frames in a compositing window system.

This is achieved, in embodiments of the technology described herein at least, by eliminating unnecessary frame sub-region rendering operations. This reduces the amount of data that is rendered to the frame buffer, thereby significantly reducing system power consumption and the amount of memory bandwidth consumed.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system that comprises a host processor and a graphics processor that in response to commands and data received from applications on the host processor, renders frames to be output and writes those frames to a frame buffer, the method comprising:

when a new application frame to be used in a composited frame, the composited frame being composited from plural application frames, is to be generated and written to the frame buffer:

determining by the host processor or the graphics processor, for a set of plural sub-regions that the new application frame has been divided into, which of those sub-regions could have changed from a previous application frame previously-used for the frame buffer;

generating information indicating, for the set of plural sub-regions, which of those sub-regions should be rendered to generate the new application frame on the basis of the determination, said information comprising an indication, for each sub-region of the set of plural sub-regions, indicating whether the sub-region should be rendered or should not be rendered to generate the new application frame; and providing to the graphics processor said information indicating, for the set of plural sub-regions, which of those sub-regions should be rendered to generate the new application frame; and the graphics processor:

using said information indicating, for the set of plural sub regions, which of those sub regions should be rendered to generate the new application frame to determine those sub-regions in the new application frame that the graphics processor should render;

rendering those sub-regions in the new application frame that the graphics processor has determined should be rendered using said information indicating, for the set of plural sub regions, which of those sub regions should be rendered to generate the new application frame; and writing the so-rendered sub-regions of the new application frame to the frame buffer;

and wherein:

the graphics processor does not render one or more sub-regions in the new application frame that the graphics processor has not determined should be rendered using said information indicating, for the set of plural sub regions, which of those sub regions should be rendered to generate the new application frame; and any sub-regions in the new application frame that the graphics processor does not render are retained in or copied to the frame buffer from the previous application frame previously used for the frame buffer so as to be present in the frame buffer with the sub-regions in the new application frame that the graphics processor has rendered and written to the frame buffer;

wherein each new application frame sub-region corresponds to a rendering tile that the graphics processor that is rendering the application frame produces as its rendering output; or wherein each new application frame sub-region corresponds to a set of plural rendering tiles that the graphics processor that is rendering the application frame produces as its rendering output.

2. The method of claim 1, comprising determining which sub-regions could have changed from the application frame previously used for the frame buffer from a list of dirty regions provided by the host processor.

3. The method of claim 1, comprising determining which sub-regions could have changed from the application frame previously used for the frame buffer by converting a screen-space area indication of changed parts of an application frame to sub-region indications within the application frame.

4. The method of claim 1, comprising determining which sub-regions could have changed from the application frame previously used for the frame buffer by comparing respective sub-regions in the application frames to determine which sub-regions have changed between the application frames.

5. The method of claim 4, wherein the comparison process comprises comparing signatures representative of the content of the respective application frame sub-regions.

6. The method of claim 1, wherein said information indicating, for the set of plural sub regions, which of those sub-regions should be rendered to generate the new application frame comprises a bitmap with each bit representing a respective sub-region in the new application frame.

7. The method of claim 1, wherein the host processor determines which of the sub-regions could have changed from the application frame previously used for the frame buffer, and generates said information indicating, for the set of plural sub regions, which of those sub-regions should be rendered to generate the new application frame.

8. The method of claim 1, wherein the graphics processor determines which of the sub-regions could have changed from the application frame previously used for the frame buffer, and generates said information indicating, for the set of plural sub regions, which of those sub-regions should be rendered to generate the new application frame.

9. A data processing system comprising:

a host processor;

a graphics processor that in response to commands and data received from applications on the host processor, renders frames to be output and writes those frames to a frame buffer; and a frame buffer that stores output frames generated by the graphics processor;

wherein the data processing system is configured to:

when a new application frame to be used in a composited frame, the composited frame being composited from plural application frames, is to be generated and written to the frame buffer:

determine by the host processor or the graphics processor, for a set of plural sub-regions that the new application frame has been divided into, which of those sub-regions could have changed from a previous application frame previously used for the frame buffer;

generate information indicating, for the set of plural sub-regions, which of those sub-regions should be rendered to generate the new application frame on the basis of the determination, said information comprising an indication, for each sub-region of the set of plural sub-regions, indicating whether the sub-region should be rendered or should not be rendered to generate the new application frame; and provide to the graphics processor said information indicating, for the set of plural sub-regions, which of those sub-regions should be rendered to generate the new application frame; and the graphics processor is configured to:

use said information indicating, for the set of plural sub regions, which of those sub regions should be rendered to generate the new application frame to determine those sub-regions in the new application frame that the graphics processor should render;

render those sub-regions in the new application frame that the graphics processor has determined should be rendered using said information indicating, for the set of plural sub regions, which of those sub regions should be rendered to generate the new application frame; and write the so-rendered sub-regions of the new application frame to the frame buffer;

and wherein:

the graphics processor does not render one or more sub-regions in the new application frame that the graphics processor has not determined should be rendered using said information indicating, for the set of plural sub regions, which of those sub regions should be rendered to generate the new application frame; and any sub-regions in the new application frame that the graphics processor does not render are retained in or copied to the frame buffer from the previous application frame previously used for the frame buffer so as to be present in the frame buffer with the sub-regions in the new application frame that the graphics processor has rendered and written to the frame buffer;

wherein each new application frame sub-region corresponds to a rendering tile that the graphics processor that is rendering the application frame produces as its rendering output; or wherein each new application frame sub-region corresponds to a set of plural rendering tiles that the graphics processor that is rendering the application frame produces as its rendering output.

10. The system of claim 9, wherein the sub-regions that could have changed from the application frame previously used for the frame buffer are determined from a list of dirty regions provided by the host processor.

11. The system of claim 9, wherein the sub-regions that could have changed from the application frame previously used for the frame buffer are determined by converting a screen-space area indication of changed parts of an application frame to sub-region indications within the application frame.

12. The system of claim 9, wherein the sub-regions that could have changed from the application frame previously used for the frame buffer are determined by comparing respective sub-regions in the application frames to determine which sub-regions have changed between the application frames.

13. The system of claim 12, wherein the comparison process comprises comparing signatures representative of the content of the respective application frame sub-regions.

14. The system of claim 9, wherein said information indicating, for the set of plural sub regions, which of those sub-regions should be rendered to generate the new application frame comprises a bitmap with each bit representing a respective sub-region in the new application frame.

15. The system of claim 9, wherein the host processor determines which of the sub-regions could have changed from the application frame previously used for the frame buffer, and generates said information indicating, for the set of plural sub regions, which of those sub-regions should be rendered to generate the new application frame.

16. The system of claim 9, wherein the graphics processor determines which of the sub-regions could have changed from the application frame previously used for the frame buffer, and generates said information indicating, for the set of plural sub regions, which of those sub-regions should be rendered to generate the new application frame.

17. A non-transitory computer readable storage medium storing computer software code which when executing on a processor performs a method of operating a data processing system that comprises a host processor and a graphics processor that in response to commands and data received from applications on the host processor, renders frames to be output and writes those frames to a frame buffer, the method comprising:

when a new application frame to be used in a composited frame, the composited frame being composited from plural application frames, is to be generated and written to the frame buffer:

determining by the host processor or the graphics processor, for a set of plural sub-regions that the new application frame has been divided into, which of those sub-regions could have changed from a previous application frame previously-used for the frame buffer;

generating information indicating, for the set of plural sub-regions, which of those sub-regions should be rendered to generate the new application frame on the basis of the determination, said information comprising an indication, for each sub-region of the set of plural sub-regions, indicating whether the sub-region should be rendered or should not be rendered to generate the new application frame; and providing to the graphics processor said information indicating, for the set of plural sub-regions, which of those sub-regions should be rendered to generate the new application frame; and the graphics processor:

using said information indicating, for the set of plural sub regions, which of those sub regions should be rendered to generate the new application frame to determine those sub-regions in the new application frame that the graphics processor should render;

rendering those sub-regions in the new application frame that the graphics processor has determined should be rendered using said information indicating, for the set of plural sub regions, which of those sub regions should be rendered to generate the new application frame;

and writing the so-rendered sub-regions of the new application frame to the frame buffer;

and wherein:

the graphics processor does not render one or more sub-regions in the new application frame that the graphics processor has not determined should be rendered using said information indicating, for the set of plural sub regions, which of those sub regions should be rendered to generate the new application frame; and any sub-regions in the new application frame that the graphics processor does not render are retained in or copied to the frame buffer from the previous application frame previously used for the frame buffer so as to be present in the frame buffer with the sub-regions in the new application frame that the graphics processor has rendered and written to the frame buffer;

wherein each new application frame sub-region corresponds to a rendering tile that the graphics processor that is rendering the application frame produces as its rendering output; or wherein each new application frame sub-region corresponds to a set of plural rendering tiles that the graphics processor that is rendering the application frame produces as its rendering output.

\* \* \* \* \*